US012808290B2

(12) United States Patent
Li et al.

(10) Patent No.: US 12,808,290 B2
(45) Date of Patent: Nov. 24, 2026

(54) SYSTEMS AND METHODS FOR CONVERTING DIPMETER LOG CURVES TO BOREHOLE IMAGE LOGS

(71) Applicant: SAUDI ARABIAN OIL COMPANY, Dhahran (SA)

(72) Inventors: Yunsheng William Li, Dhahran (SA); Weihua Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 664 days.

(21) Appl. No.: 18/181,485

(22) Filed: Mar. 9, 2023

(65) Prior Publication Data

US 2024/0301785 A1 Sep. 12, 2024

(51) Int. Cl.
*E21B 47/002* (2012.01)
*G01V 3/38* (2006.01)

(52) U.S. Cl.
CPC ............ *E21B 47/0025* (2020.05); *G01V 3/38* (2013.01)

(58) Field of Classification Search
None
See application file for complete search history.

(56) References Cited

U.S. PATENT DOCUMENTS 4,414,656 A * 11/1983 Hepp ...................... G01V 3/38 702/10
4,567,759 A 2/1986 Ekstrom et al.
4,758,956 A * 7/1988 Duffy ..................... G01V 1/288 702/10
2015/0279093 A1* 10/2015 Sung ........................ E21B 25/00
2016/0130930 A1* 5/2016 Gelman .............. E21B 47/0025 382/109
2020/0265615 A1* 8/2020 Di Santo ................. E21B 49/00
2021/0356615 A1* 11/2021 Nguyen ................ E21B 47/026
(Continued)

FOREIGN PATENT DOCUMENTS

GB 1468351 A * 3/1977 ........... E21B 47/026

OTHER PUBLICATIONS

C. Hocker, K.M.Eastwood, J.C.Herweijer, and J.T.Adams, Use of Dipmeter Data in Calstic Sedimentological Studies, The American Association of Petroleum Geologists Bulletin V.74, No. 2 (Feb. 1990), p. 105-118.

(Continued)

*Primary Examiner* — Lina Cordero
(74) *Attorney, Agent, or Firm* — Vorys, Sater, Seymour and Pease LLP

(57) ABSTRACT

In some examples, a system includes an image processing module, implemented by at least one processor, to generate one or more photo images using dipmeter logging data; and a dip data module, implemented by the at least one processor, to determine dip data using at least one of the dipmeter logging data or a borehole image log generated based on the one or more photo images. The system may be configured to perform a method for converting dipmeter logs to borehole image logs, where the method includes generating one or more image arrays using dipmeter logging data, converting the one or more image arrays into one or more photo images, decomposing the one or more photo images to one or more color components of a color matrix, and generating one or more borehole image logs using a first color component of the color matrix, for example.

18 Claims, 8 Drawing Sheets

(56) References Cited

U.S. PATENT DOCUMENTS

| | | | | |
|---|---|---|---|---|
| 2023/0041858 A1* | 2/2023 | Ma | ............................ | G06T 5/77 |
| 2025/0029213 A1* | 1/2025 | Gelman | .................... | G06T 5/60 |

OTHER PUBLICATIONS

Jean-Pierre Delhomme, Thierry Pilenko, Etienne Cheruvier, Richard Cull, Reservoir Applications of Dipmeter Logs, Journal of Petroleum Technology V.40, No. 02 (Feb. 1, 1988), p. 180-186.

L.A. Allaud, J.Ringot, The High Resolution Dipmeter Tool, The Log Analyst V.10, No. 3 (May 1, 1969), p. 3-11.

* cited by examiner

SYSTEMS AND METHODS FOR CONVERTING DIPMETER LOG CURVES TO BOREHOLE IMAGE LOGS

FIELD OF THE DISCLOSURE

This disclosure relates generally to identifying structural and sedimentary features in subsurface formations, and more particularly, to systems and methods for converting dipmeter log curves into borehole image logs to identify dip data in subsurface formations.

BACKGROUND OF THE DISCLOSURE

In the oil and gas industry, field development can depend upon visualizations of a subsurface formation that includes one or more different sedimentary layers. The one or more sedimentary layers may include impermeable layers having faults that may trap hydrocarbons such as oil and gas as well as semi-permeable and permeable layers that may include hydrocarbons. The visualization enables identifying the structural and sedimentary features of the subsurface formation. Different types of logging may be utilized to capture data that may be converted to logs or curves for visualization of the subsurface formation. One such type of logging uses a dipmeter tool that is sent down a borehole drilled into the subsurface formation. The dipmeter tool measures electrical characteristics (e.g., resistivity, conductivity) of the subsurface formation that intersects the borehole. Generating logging curves based on the measurements enables determination of dip data (e.g., angular dipping of sedimentary layers, textural changes of the sedimentary layers at a dip, types of the sedimentary layers around the dip, as well as deformations of the sedimentary layers). A dipmeter tool may include multiple pad members symmetrically disposed around an elongated housing on arm members. Each arm member moves to push an associated pad member against a wall of the borehole. Each pad member includes one or more electrodes used to measure the electrical resistivity or conductivity of a material of the subsurface formation. While dipmeter tools reduce operational costs when compared to more technologically complex tools (e.g., borehole imaging tools using ultrasonic reflection, electrical scanning, or optical scanning techniques), measurements are limited by the number of arm members and a spacing of the electrodes, resulting in reduced resolution, accuracy, or the like, in comparison to the more technologically complex tools.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method for converting dipmeter logs to borehole image logs includes generating one or more image arrays using dipmeter logging data, converting the one or more image arrays into one or more photo images, decomposing the one or more photo images to one or more color components of a color matrix, and generating one or more borehole image logs using a first color component of the color matrix.

In another embodiment consistent with the present disclosure, a non-transitory computer-readable medium stores machine-readable instructions, which, when executed by a processor, cause the processor to generate one or more image arrays using dipmeter logging data, convert the one or more image arrays into one or more photo images, decompose the one or more photo images to one or more color components of a color matrix, and generate one or more borehole image logs using a first color component of the color matrix.

According to another embodiment consistent with the present disclosure, a system includes an image processing module, implemented by at least one processor, to generate one or more photo images using dipmeter logging data; and a dip data module, implemented by the at least one processor, to determine dip data using at least one of the dipmeter logging data or a borehole image log generated based on the one or more photo images.

Any combinations of the various embodiments and implementations disclosed herein can be used in a further embodiment, consistent with the disclosure. These and other aspects and features are better appreciated according to the following description of certain embodiments presented herein in accordance with the disclosure and the accompanying drawings and claims.

DETAILED DESCRIPTION

Figure 1:
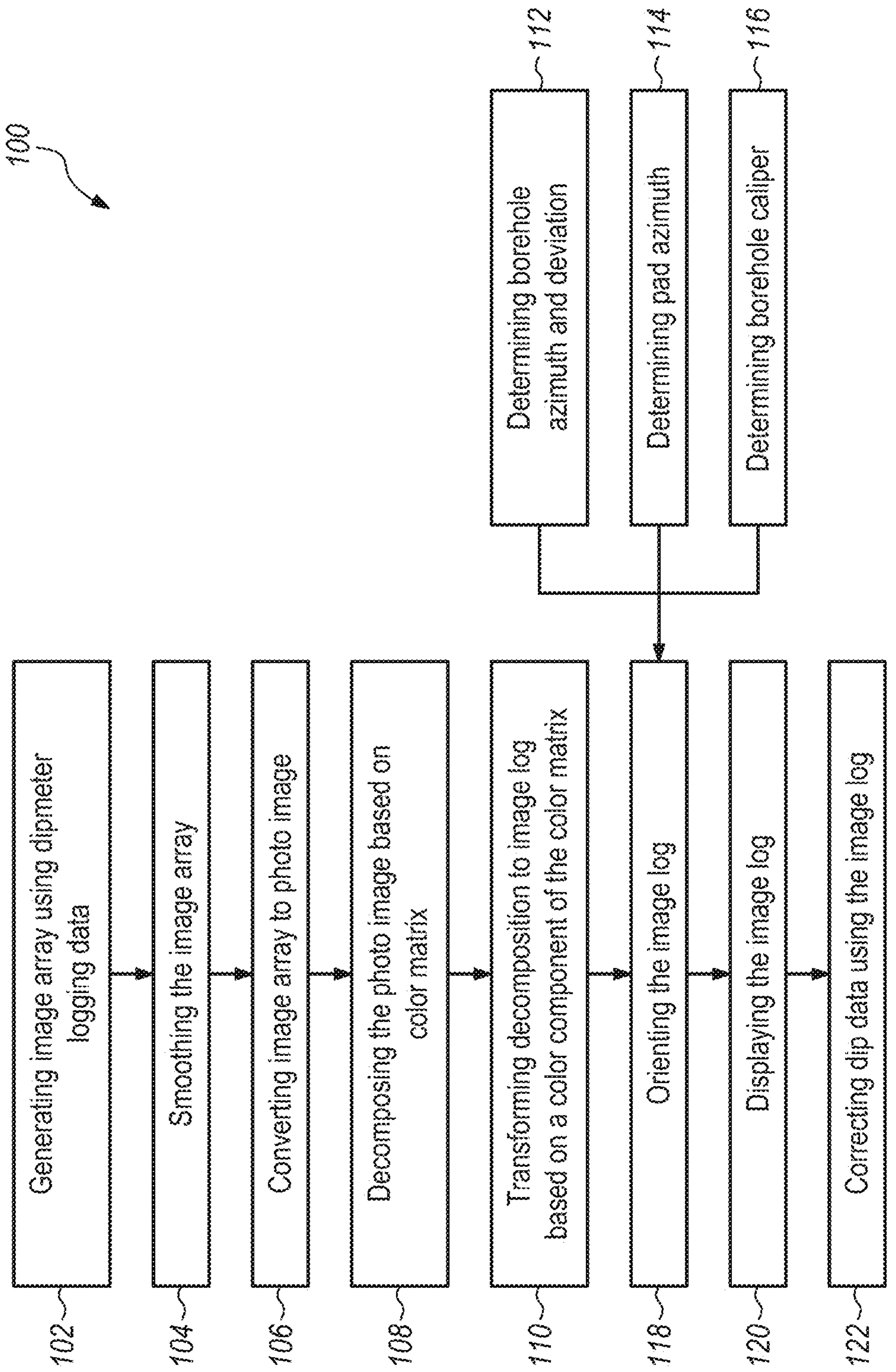
FIG. 1 is a flowchart of a method for converting dipmeter log curves to borehole image logs to identify dip data of a subsurface formation, in accordance with certain embodiments.

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to identifying structural and sedimentary features in subsurface formations, and more particularly, to systems and methods for converting dipmeter log curves into borehole image logs to identify dip data of subsurface formations. The dipmeter log curves are generated from measurements collected by a dipmeter tool. As described above, the dipmeter log curves enable determination of dip data (e.g., angular dipping of sedimentary layers, textural changes of the sedimentary layers at a dip, types of the sedimentary layers around the dip, as well as deformations of the sedimentary layers), but the determinations may have less accuracy when compared to borehole image logs. Examples are described herein in which systems and methods are used for converting dipmeter log curves into borehole image logs to identify dip data. A method for converting dipmeter log curves into borehole image logs to identify dip data may include generating one or more image arrays using dipmeter logging data, converting the one or more image arrays into one or more photo images, decomposing the one or more photo images to one or more color components of a color matrix, and generating one or more borehole image logs using a first color component of the color matrix. A system for converting dipmeter log curves into borehole image logs to identify dip data includes an image processing module, implemented by at least one processor, to generate the one or more photo images using the dipmeter logging data, and a dip data module, implemented by the at least one processor, to determine dip data using at least one of the dipmeter logging data or a borehole image log generated based on the one or more photo images.

Converting the dipmeter log curves to borehole image logs increases the accuracy of identifying dip data from measurements of dipmeter tools. Identifying dip data in a subsurface formation with increased accuracy improves identification of angular dipping of sedimentary layers, textural changes of the sedimentary layers at a dip, types of the sedimentary layers around the dip, as well as deformations of the sedimentary layers. Additionally, the systems and methods can be used in other industries outside of oil and gas, for example, in the mining industry, the quarry industry, the hydrological industry, or like industries in which drilling or quarrying of subterranean formations can be performed. Thus, the systems and methods as described herein can be used in any environment or industry to improve identification of structural and sedimentary features in subsurface formations.

FIG. 1 is a flowchart of a method 100 for converting dipmeter log curves to borehole image logs to identify dip data of a subsurface formation, in accordance with certain embodiments. The method 100 can be partially or fully implemented by a system, such as a system 700 shown in FIG. 7 or a computer system 800 shown in FIG. 8, and may allow dipmeter logging data associated with a subsurface formation to be translated into a subsurface dip data model that identifies dip data of the subsurface formation. The method 100 includes generating an image array using dipmeter logging data (102), smoothing the image array (104), converting the image array to a photo image (106), decomposing the photo image by color matrix (108), transforming the color matrix decomposition to an image log (110), determining the borehole azimuth and deviation (112), determining the pad azimuth (114), determining the borehole caliper (116), orienting the image log (118), displaying the image log (120), and correcting dip data using the image log (122).

In a non-limiting example, the method 100 starts with receiving dipmeter logging data associated with the subsurface formation. The dipmeter logging data may include measurements for each electrode of each pad of each arm of a dipmeter tool, where the measurements are taken at different depths of a borehole as the dipmeter tool traverses the borehole, for example. Receiving the dipmeter logging data may include receiving the dipmeter logging data from an input device or a network interface, such as described with respect to FIG. 8, for example. In another example, receiving the dipmeter logging data may include retrieving the dipmeter logging data from a computer-readable medium, such as described with respect to FIG. 8. The dipmeter logging data is received from a computer-readable medium of the dipmeter tool or a computer-readable medium storing the dipmeter tool data to the present system or a different system, for example.

The method 100 also includes, in a non-limiting example, generating dipmeter log curves based on the dipmeter logging data. A dipmeter log curve may be generated using measurements for an arm of the dipmeter tool, for example, so that each arm is associated with a different dipmeter log curve. The method 100 may generate four dipmeter log curves for a dipmeter tool having four arms or eight dipmeter log curve for a dipmeter tool having eight arms, for example. In a non-limiting example, the method 100 may cause an output device, such as described with respect to FIG. 8, to display one or more of the dipmeter logging data or the dipmeter log curves. For example, the method 100 may cause the output device to display plots 202 of output 200 shown in FIG. 2. The dipmeter log curves are one-dimensional (1D) plots of the dipmeter logging data. In another non-limiting example, the method 100 may include storing one or more of the dipmeter logging data or the dipmeter log curves to a computer-readable medium, such as described with respect to FIG. 8.

In a non-limiting example, the method 100 includes generating an image array using the dipmeter log curves. Generating the image array using the dipmeter log curves converts the 1D plots to a two-dimensional (2D) dataset. In a non-limiting example, the method 100 may use a technique (e.g., reshaping, transformation, merging, or other image processing techniques) for converting datasets from 1D log curves to 2D arrays. The method 100 may cause an output device to display a resulting image of graphing the 2D dataset. For example, the method 100 may cause the output device to display a graph 204 of output 200 shown in FIG. 2. In another non-limiting example, the method 100 may include storing the 2D dataset, the graph of the image array, or a combination thereof, to a computer-readable medium, such as described with respect to FIG. 8.

Additionally, in certain embodiments, the method 100 includes smoothing the image array using one or more image processing techniques to smooth boundaries between the different data sets associated with each dipmeter log curve and to improve a quality of the image array. The one or more image processing techniques may include applying one or more smoothing filters (e.g., average or mean, Gaussian, adaptive), using an interpolation technique (e.g., linear interpolation, polynomial interpolation, a spline), or like techniques for data fitting or reducing noise between the different data sets. In a non-limiting example, the method 100 may cause an output device to display one or more of the smoothed 2D dataset or a graph of a smoothed image array. For example, the method 100 may cause the output device to display a graph 302 of output 300 shown in FIG. 3. In another non-limiting example, the method 100 may include storing the smoothed 2D dataset, the graph of the smoothed image array, or a combination thereof, to a computer-readable medium, such as described with respect to FIG. 8.

In certain embodiments, the method 100 includes converting the smoothed image array to a photo image. The photo image may be a .JPG, a .PNG, a .BMP, a .GIF, a .TIFF, or the like. In a non-limiting example, the method 100 may cause an output device to display the photo image. For example, the method 100 may cause the output device to display a graph 304 of output 300 shown in FIG. 3. In another non-limiting example, the method 100 may include storing the photo image to a computer-readable medium, such as described with respect to FIG. 8. Converting the smoothed image array to the photo image preserves features of the smoothed array and enhances the sharpness of the features.

In certain embodiments, the method 100 also includes, decomposing the photo image based on a color matrix. The color matrix indicates a number of layers, a number of channels, or a combination thereof, with which to describe the photo image. The color matrix may indicate a red/green/blue (RGB) color model, a red/green/blue/alpha (RGBA) color model, a hue/saturation/value (HSV) color model, a hue/saturation/lightness (HSL) color model, a cyan/magenta/yellow/black (CYMK) color model, or like color models used by image processing computer applications. In a non-limiting example, prior to decomposing, a photo image having a non-RGB color model is converted to a photo image having an RGB model using a conversion technique. In another non-limiting example, the color matrix includes a red component, a green component, a blue component, and a grayscale component. Decomposing the photo image based on the color matrix converts the photo image into a grayscale image having multiple layers, one layer per color component. A layer represents a 2D dataset. In a non-limiting example, the method 100 may cause an output device to display one or more graphs of the multiple layers, where each graph is a graph of an image array representing a color component. For example, the method 100 may cause the output device to display a graph 402 of output 400 shown in FIG. 4, where the graph includes graphs of image arrays representing the red component, the green component, the blue component, and the grayscale component, respectively. In another non-limiting example, the method 100 may include storing one or more of datasets associated with the multiple image arrays or the one or more graphs of the multiple image arrays to a computer-readable medium, such as described with respect to FIG. 8. In a non-limiting example, the method 100 includes determining that the graph of the one or more graphs of the multiple image arrays associated with the grayscale component of the color matrix is the image log. The method 100 may include storing the graph of the one or more graphs of the multiple image arrays associated with the grayscale component of the color matrix as the image log, for example.

In a non-limiting example, orienting the image log (118) uses at least one of a borehole azimuth, a borehole deviation, a pad azimuth, or a borehole caliper, and the method 100 includes determining the borehole azimuth and deviation (112), determining the pad azimuth (114), and determining the borehole caliper (116) using the dipmeter logging data. The borehole azimuth is a degree of the borehole with respect to the geographic or magnetic north pole, as measured clockwise from north. The borehole deviation is an angular change from a specified drilling direction. The pad azimuth is a degree of the dipmeter tool with respect to the geographic or magnetic north pole. In a non-limiting example, a first pad, which may herein be referred to as pad 1, of the dipmeter tool is used as a reference point for determining the pad azimuth. The pad azimuth provides a direction for rotating the image log. The borehole deviation provides an indication of the northward direction. The borehole azimuth provides the borehole direction. The borehole caliper is a diameter of the borehole. In a non-limiting example, the borehole caliper is determined by a caliper size of a drilling tool string that includes the dipmeter tool. In a non-limiting example, the dipmeter tool measures one or more of the borehole azimuth, the borehole deviation, the pad azimuth, or the borehole caliper and stores the measurements as dipmeter logging data. The method 100 includes parsing the one or more of the borehole azimuth, the borehole deviation, the pad azimuth, or the borehole caliper from the dipmeter logging data. Orienting the image log transforms the image log to a borehole image log, as borehole image logs include orientation data. The borehole image log may herein be referred to as a dipmeter image log. In a non-limiting example, the method 100 may cause the output device to display the oriented image log. For example, the method 100 may cause the output device to display a graph 502 of output 500 shown in FIG. 5.

Additionally, in a non-limiting example, the method 100 includes displaying one or more of the dipmeter log curves with a plot of dip data, the dipmeter image log with the plot of the dip data, or the dipmeter image log with a plot of corrected dip data. The one or more of the dipmeter log curves with a plot of dip data, the dipmeter image log with the plot of the dip data, or the dipmeter image log with a plot of corrected dip data may be referred to as a subsurface dip data model. For example, the method 100 may cause the output device to display graphs 602, 604, 606 of output 600 shown in FIG. 6. The method 100 may include storing the one or more of the dipmeter log curves with a plot of dip data, the dipmeter image log with the plot of the dip data, or the dipmeter image log with a plot of corrected dip data to a computer-readable medium, such as described with respect to FIG. 8, for example.

For example, the method 100 includes using the dipmeter log curves to identify one or more dips. The method 100 may use interval correlation or feature mapping techniques to identify the one or more dips, for example. Interval correlation techniques use statistical correlations to calculate a dip, while feature mapping techniques identify features of a curve (e.g., a peak or a trough bounded by inflection points) to identify a geologic object and then link the geologic object to the remaining curves using a correlation line before calculating the dip. The method 100 includes plotting the dip data. For example, the method 100 includes displaying the dip data as an arrow plot, where a position of the dot indicates a dip angle versus a depth and a line segment pointing from the dot indicates a direction of the dip. In a non-limiting example, the method 100 also includes displaying the dip data alongside a dipmeter image log including correlation lines that indicate geologic objects associated with each dip of the dip data. Additionally, the method 100 includes displaying the dipmeter image log including corrected correlation lines alongside corrected dip data.

While, for purposes of simplicity of explanation, the method 100 of FIG. 1 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method. Executing a step multiple times may ensure an accuracy of data, a repeatability of a determination, or a combination thereof, thereby increasing an accuracy and reliability of an output of the method 100.

In some applications, the subsurface formation can form part of an oil or gas infrastructure. For example, the subsurface formation can correspond to different sections within an upstream sector. The upstream sector (also known as exploration and production) covers exploration, recovery, and production of crude oil and natural gas. Examples are presented herein in which the output of the method 100 is used for improving dip data of the subsurface formation to facilitate recovery and production in the upstream sector. However, in other examples, the output of the method 100 can be used in other industries.

Figure 2:
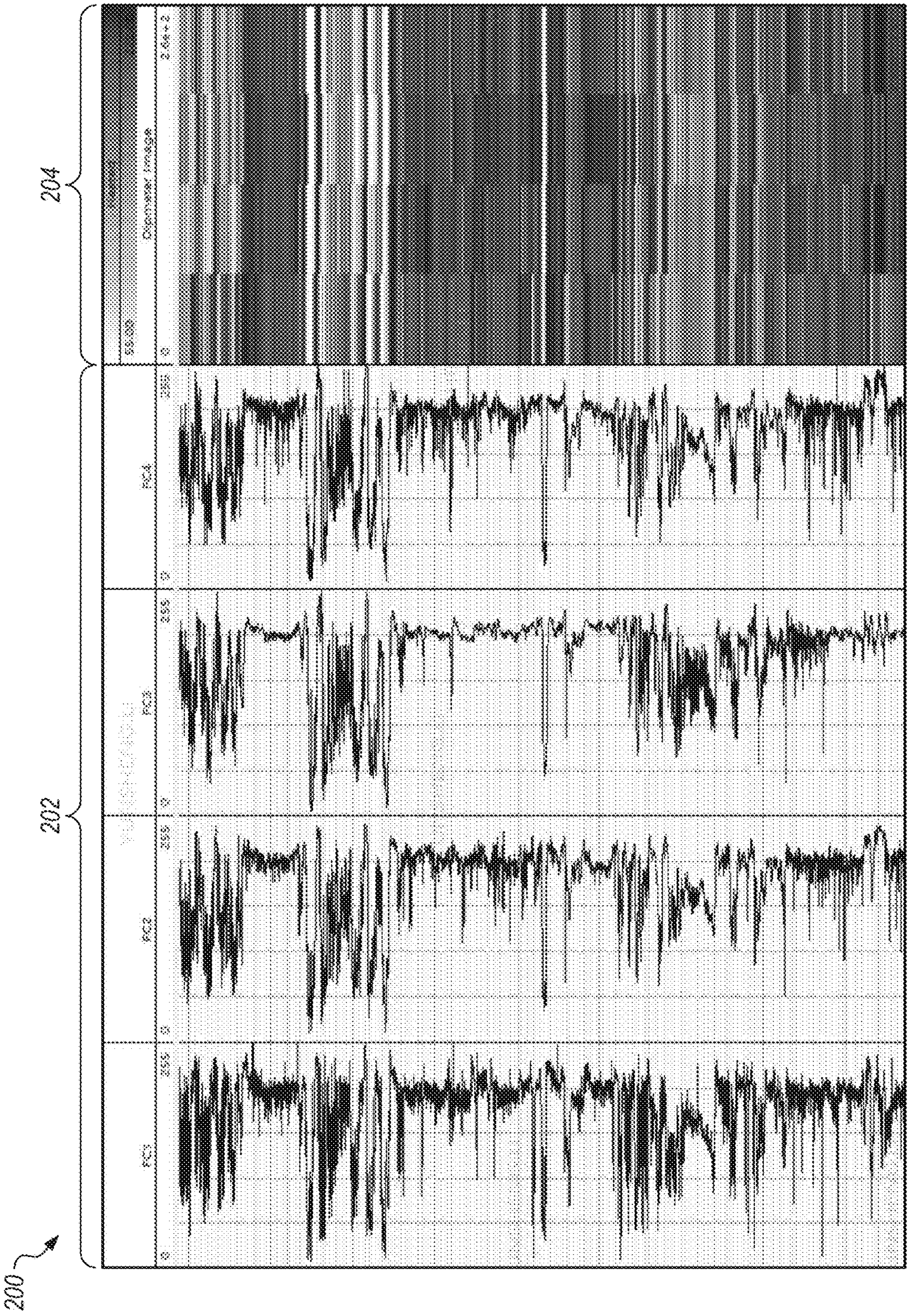
FIG. 2 is an example output of a method for converting dipmeter log curves to borehole image logs to identify dip data of a subsurface formation stem for identifying secondary porosities, in accordance with certain embodiments.

FIG. 2 is an example of a possible intermediate output 200 that may be used by a method or a system for converting dipmeter log curves to borehole image logs to identify dip data of a subsurface formation, in accordance with certain embodiments. The output 200 may be an output of the method 100 of FIG. 1, a system 700 of FIG. 7, or the computer system 800 of FIG. 8, for example. The output 200 includes plots and a graph used by the method or the system for converting dipmeter log curves to borehole image logs to identify dip data of a subsurface formation. The output 200 includes plots 202 of dipmeter log curves and a graph 204 of an image array. The plots 202 may be based on dipmeter logging data of a dipmeter tool including four arms, for example. The graph 204 of the image array is a graph of an image array generated based on the dipmeter logging data or the dipmeter log curves. The plots 202 and the graph 204 may be generated using the techniques described with respect to FIG. 1, for example.

Figure 3:
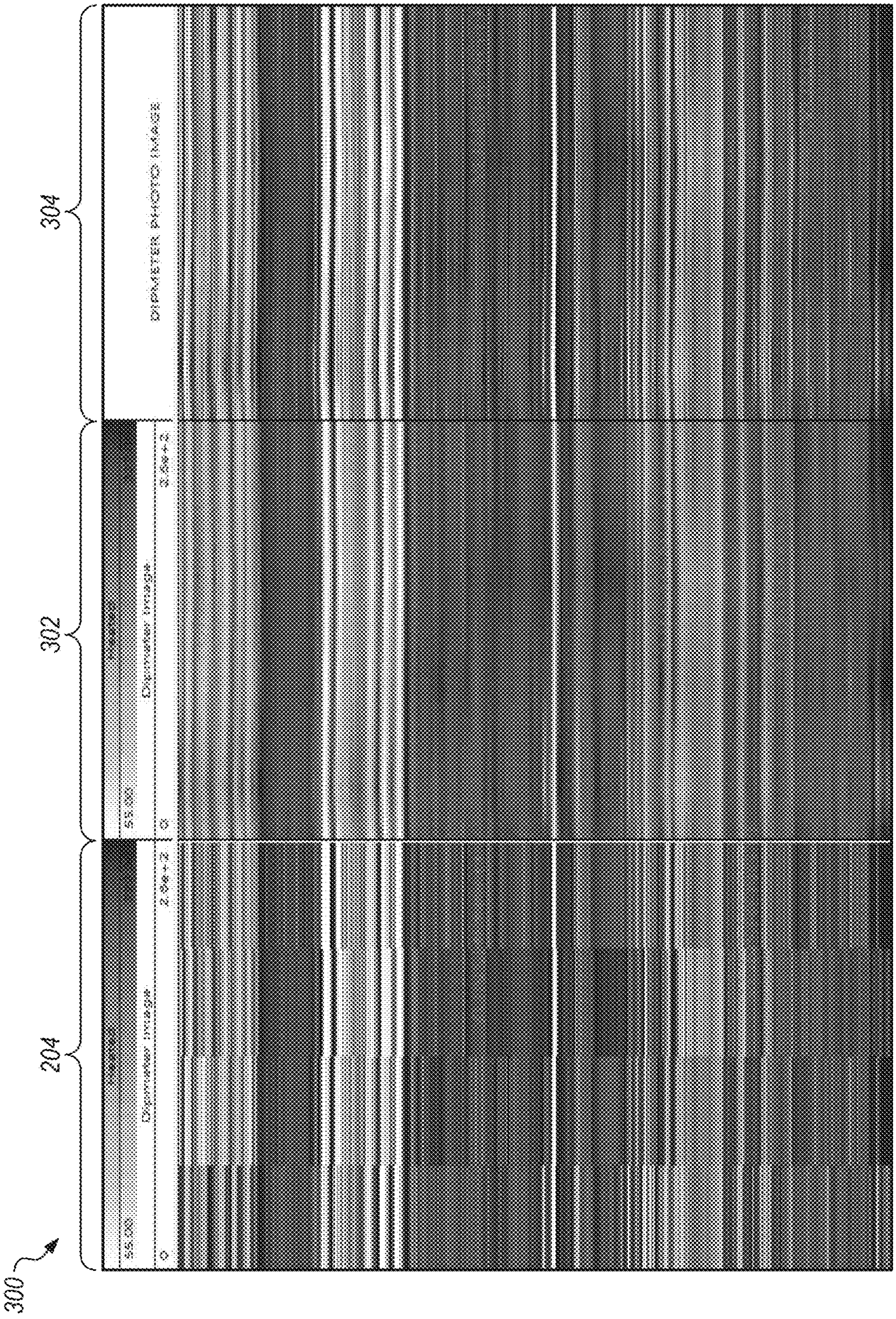
FIG. 3 is an example output of a method for converting dipmeter log curves to borehole image logs to identify dip data of a subsurface formation stem for identifying secondary porosities, in accordance with certain embodiments.

FIG. 3 is an example of a possible intermediate output 300 that may be used by a method or a system for converting dipmeter log curves to borehole image logs to identify dip data of a subsurface formation, in accordance with certain embodiments. The output 300 may be an output of the method 100 of FIG. 1, a system 700 of FIG. 7, or the computer system 800 of FIG. 8, for example. The output 300 includes multiple graphs and an image used by the method or the system for converting dipmeter log curves to borehole image logs to identify dip data of a subsurface formation. The output 300 includes the graph 204 of the image array described with respect to FIG. 2, a graph 302 of a smoothed image array, and an image 304. The graph 302 is a graph of the graph 204 that has been smoothed using image processing techniques, as described with respect to FIG. 1, for example. The graph 302 shows smoothed boundaries between the different data sets associated with each dipmeter log curve. The image 304 is a photo image of the graph 302 generated using the techniques described with respect to FIG. 1, for example. The image 304 preserves features of the smoothed array of the graph 302 and enhances the sharpness of the features.

Figure 4:
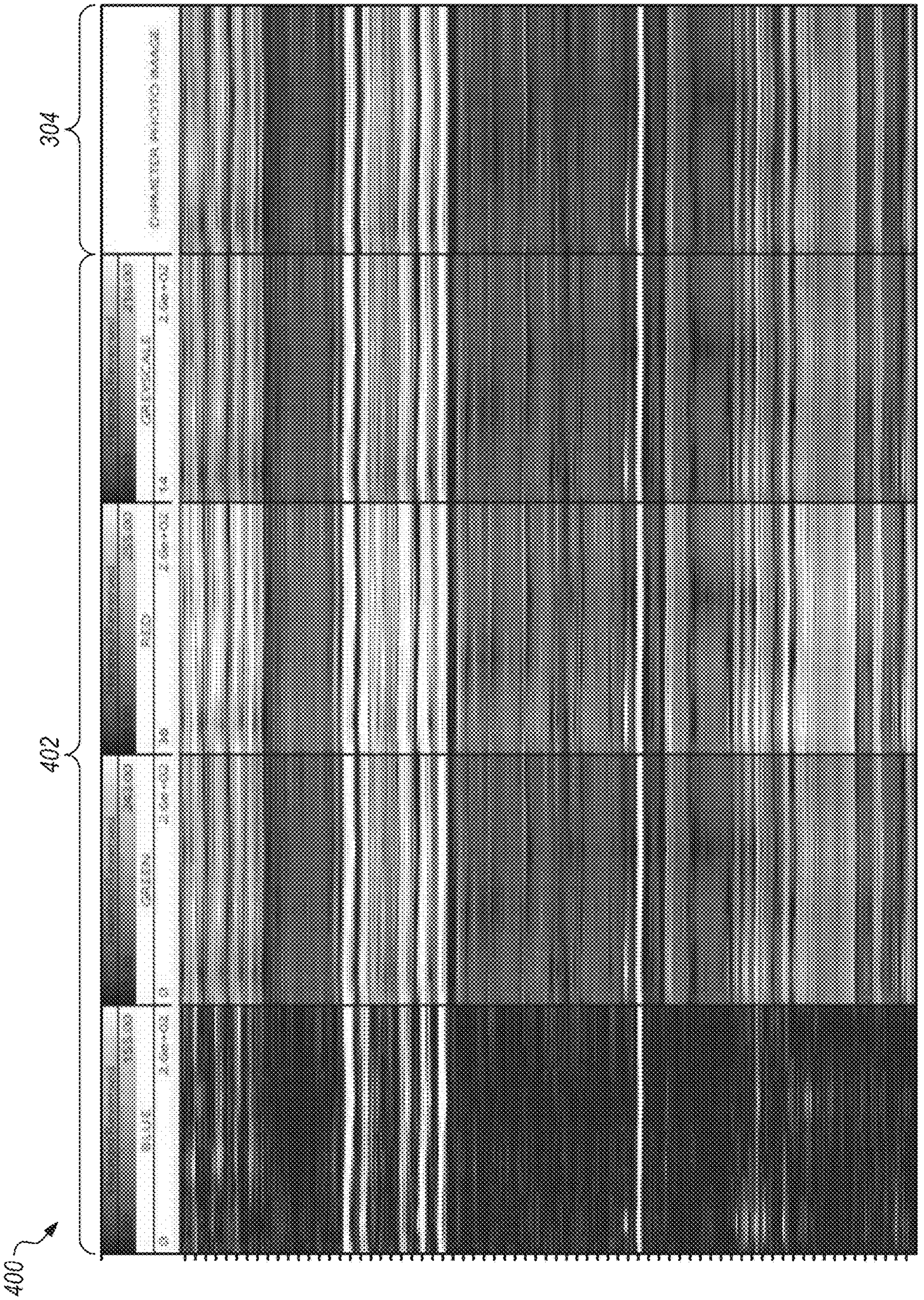
FIG. 4 is an example output of a method for converting dipmeter log curves to borehole image logs to identify dip data of a subsurface formation stem for identifying secondary porosities, in accordance with certain embodiments.

FIG. 4 is an example of a possible intermediate output 400 that may be used by a method or a system for converting dipmeter log curves to borehole image logs to identify dip data of a subsurface formation, in accordance with certain embodiments. The output 400 may be an output of the method 100 of FIG. 1, a system 700 of FIG. 7, or the computer system 800 of FIG. 8, for example. The output 400 includes multiple graphs and an image used by the method or the system for converting dipmeter log curves to borehole image logs to identify dip data of a subsurface formation. The output 400 includes graphs 402 of image arrays generated by decomposing the image 304 as described with respect to FIG. 3. The graphs 402 of the image arrays generated by decomposing the image may be generated using the techniques described with respect to FIG. 1, for example. In a non-limiting example, the color matrix includes a red component, a green component, a blue component, and a grayscale component. The graphs 402 include four graphs of image arrays representing the blue component, the green component, the red component, and the grayscale component, respectively.

Figure 5:
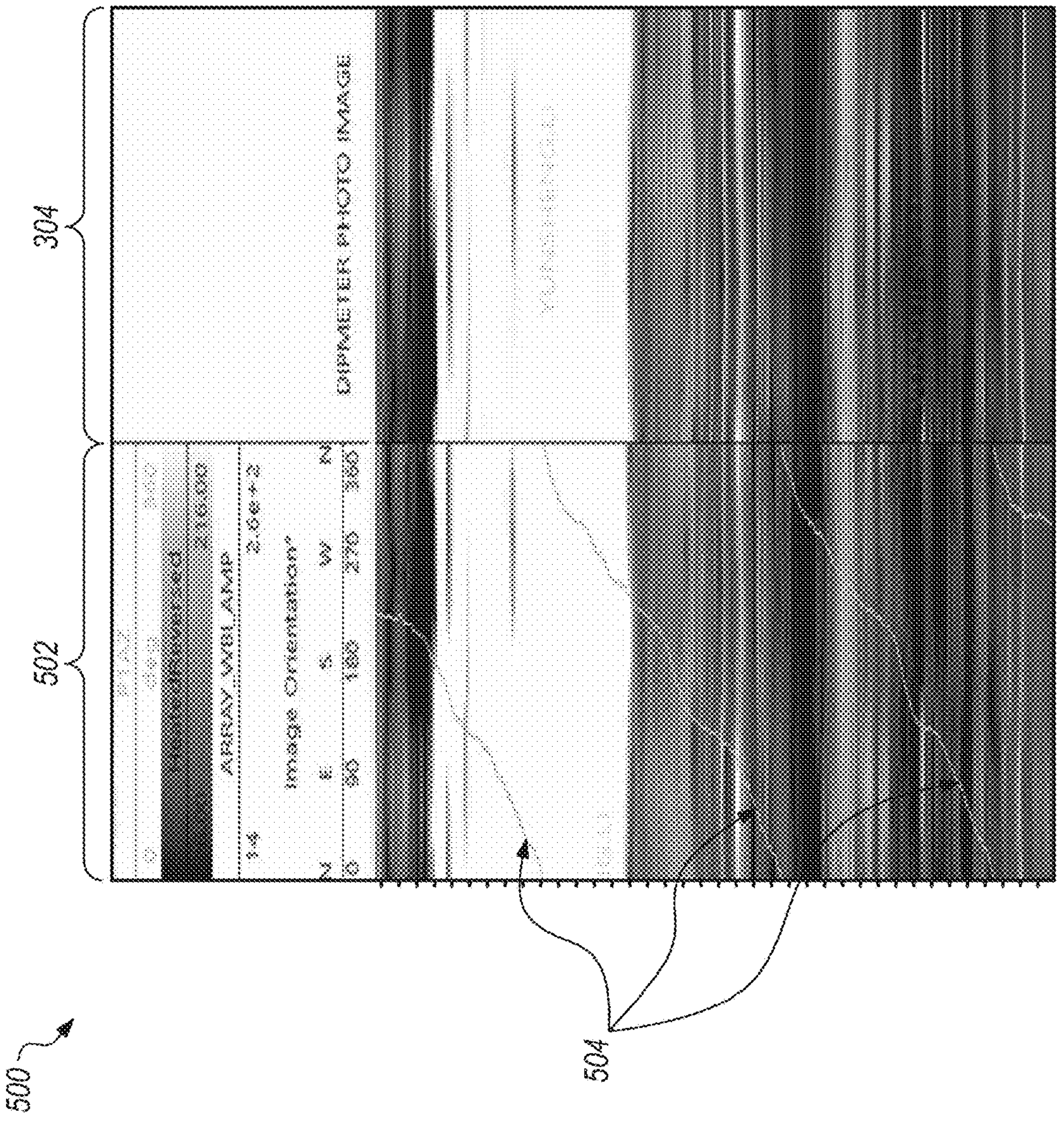
FIG. 5 is an example output of a method for converting dipmeter log curves to borehole image logs to identify dip data of a subsurface formation stem for identifying secondary porosities, in accordance with certain embodiments.

FIG. 5 is an example of a possible intermediate output 500 that may be used by a method or a system for converting dipmeter log curves to borehole image logs to identify dip data of a subsurface formation, in accordance with certain embodiments. The output 500 may be an output of the method 100 of FIG. 1, a system 700 of FIG. 7, or the computer system 800 of FIG. 8, for example. The output 500 includes an image and a graph used by the method or the system for converting dipmeter log curves to borehole image logs to identify dip data of a subsurface formation. The output 500 includes a graph 502 of an oriented borehole image log and the image 304 described with respect to FIG. 3. The graph 502 may be generated using the techniques described with respect to FIG. 1, for example. The graph 502 includes the Pad A azimuth 504. The Pad A azimuth 504 shows the rotation from 0° to 360° as the dipmeter tool is logging.

Figure 6:
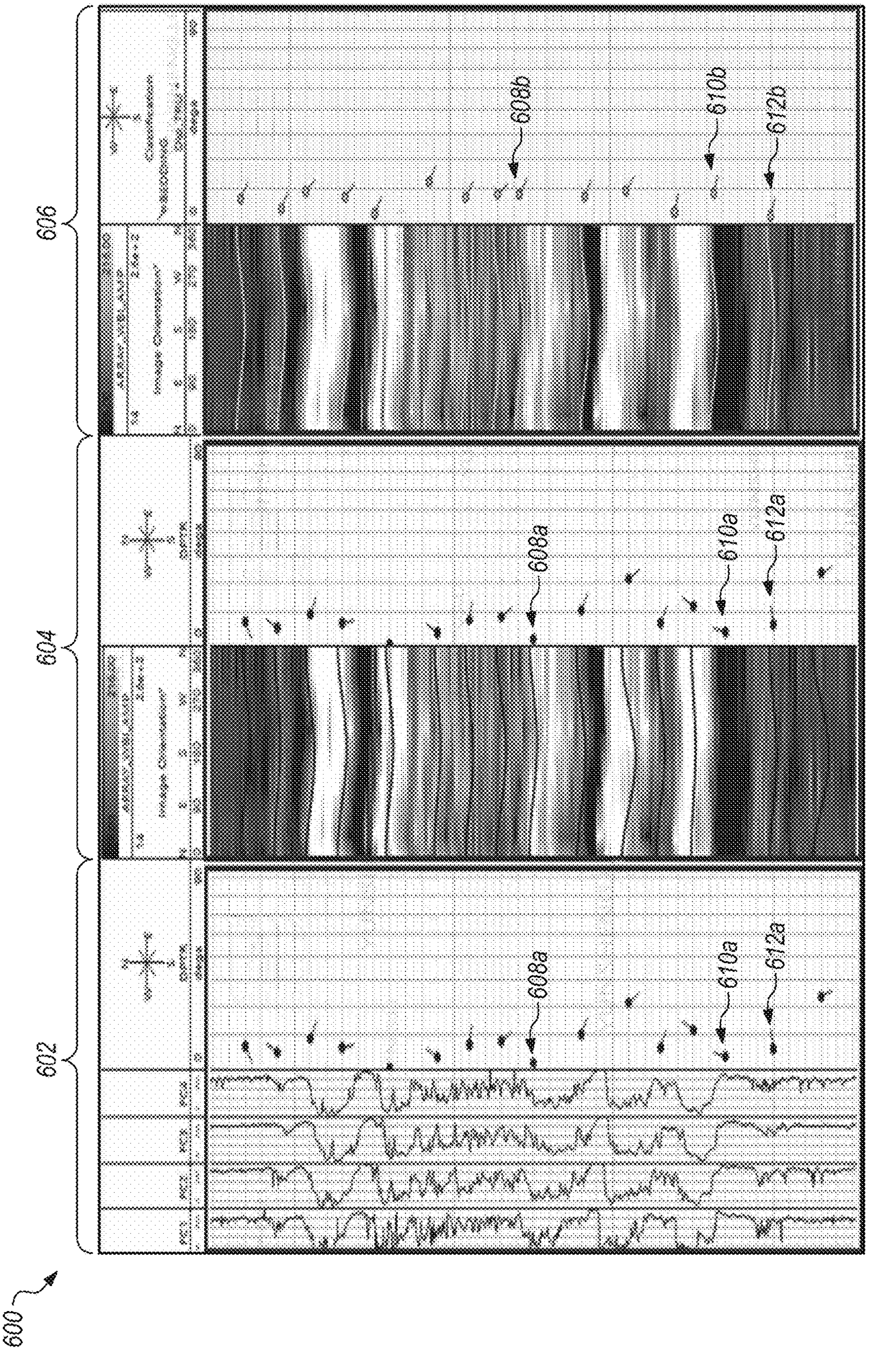
FIG. 6 is an example output of a method for converting dipmeter log curves to borehole image logs to identify dip data of a subsurface formation stem for identifying secondary porosities, in accordance with certain embodiments.

FIG. 6 is an example of a possible intermediate output 600 that may be used by a method or a system for converting dipmeter log curves to borehole image logs to identify dip data of a subsurface formation, in accordance with certain embodiments. The output 600 may be an output of the method 100 of FIG. 1, a system 700 of FIG. 7, or the computer system 800 of FIG. 8, for example. The output 600 includes multiple graphs used by the method or the system for converting dipmeter log curves to borehole image logs to identify dip data of a subsurface formation. The output 600 includes a graph 602, a graph 604, and a graph 606. The graph 602 includes dipmeter log curves with a plot of dip data. The plot of the dip data includes example dips 608*a*, 610*a*, and 612*a*. The graph 604 includes a dipmeter image log with the plot of the dip data. The graph 606 includes the dipmeter image log with a plot of corrected dip data. The plot of the corrected dip data includes example corrected dips 608*b*, 610*b*, 612*b*. The example corrected dips 608*b*, 610*b*, 612*b* include corrections of the example dips 608*a*, 610*a*, 612*a*, respectively. The graph 602, 604, 606 may be generated using the techniques described with respect to FIG. 1, for example. An x-axis of the plot of the dip data is in degrees, while a y-axis indicates a depth in the borehole The plot of the dip data includes a compass map.

In a non-limiting example, the dip data of the graphs 602, 604, 606 are arrow plots, where a position of the dot indicates a dip angle versus a depth and a line segment pointing from the dot indicates a direction of the dip. Correlating lines of the graphs 604, 606 indicate a geologic object associated with a corresponding dip or corrected dip, respectively. The corrected dip data of the graph 606 shows that the dip data of the graphs 602, 604 has been corrected in depth, direction, or a combination thereof. For example, the direction of the dips 608*a*, 610*a*, 612*a* are different than the direction of the corrected dips 608*b*, 610*b*, 612*b*, respectively. The corrected dips 608*b*, 610*b*, 612*b* may be corrected in response due to corrections made to the correlated lines of graph 604, as shown in the correlating lines of graph 606. The corrected dip data of the graph 606 aligns with the bedding directions of the dipmeter image log of the graph 606. The corrected dip data based on the dipmeter image log enhances an accuracy of the identification of angular dipping of sedimentary layers, textural changes of the sedimentary layers at a dip, types of the sedimentary layers around the dip, as well as deformations of the sedimentary layers.

Figure 7:
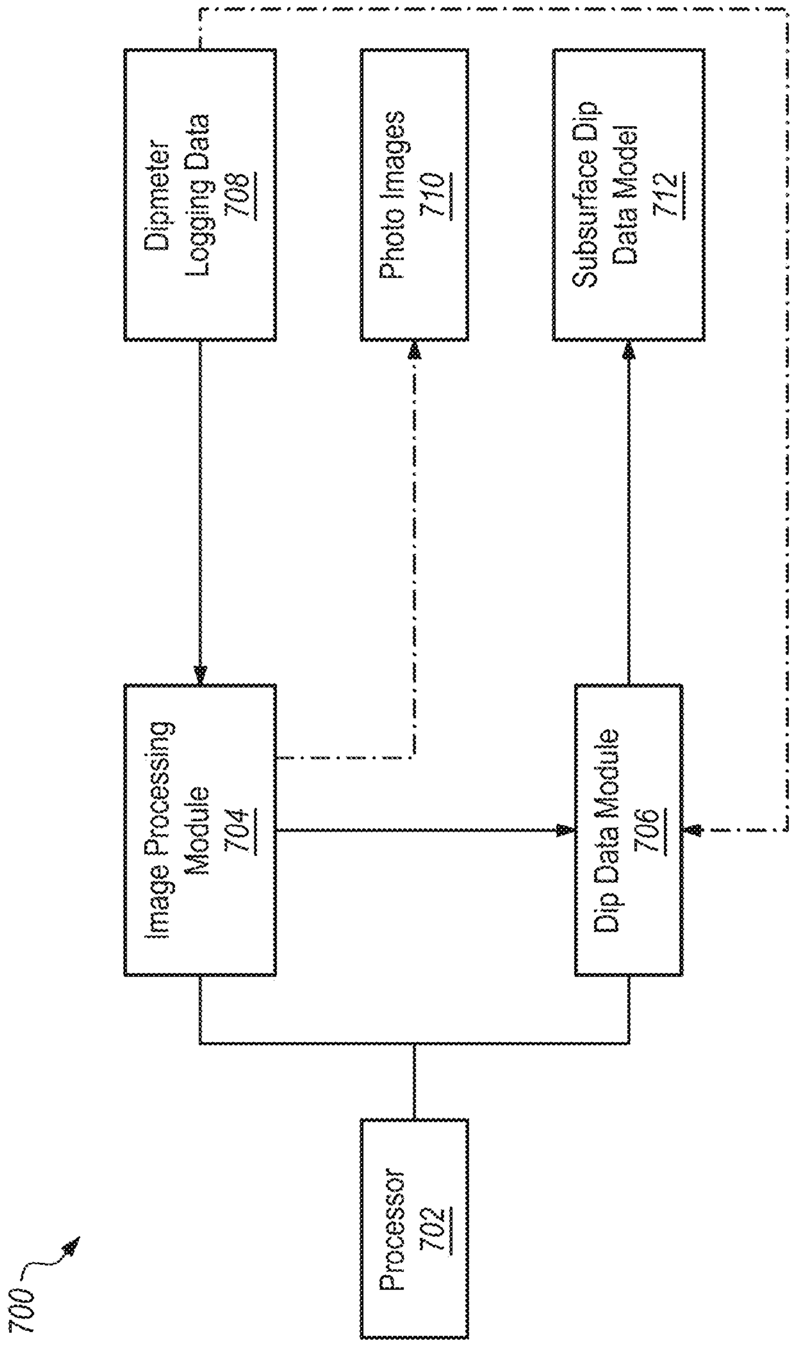
FIG. 7 is a block diagram of a system for converting dipmeter log curves to borehole image logs to identify dip data of a subsurface formation, in accordance with certain embodiments.

FIG. 7 is a system 700 for converting dipmeter log curves to borehole image logs to identify dip data of a subsurface formation, in accordance with certain embodiments. The system 700 performs the method 100 to generate one or more of the output 200, the output 300, the output 400, the output 500, the output 600, for example. In a non-limiting example, the system 700 may be implemented as the computer system 800 of FIG. 8. Thus, reference can be made to the examples of FIGS. 1-6 or FIG. 8 in the example of FIG. 7. The system 700 includes a processor 702 coupled to an image processing module 704 and a dip data module 706. The image processing module 704 receives dipmeter logging data 708. The image processing module 704 generates one or more photo images using the dipmeter logging data 708. The image processing module 704 outputs one or more datasets, one or more photo images 710, one or more graphs of the one or more datasets, or a combination thereof, where one or more of the outputs are inputs into the dip data module 706. The dip data module 706 determines dip data using at least one of the dipmeter logging data 708 or a borehole image log generated based on the one or more photo images 710. An output of the dip data module 706 includes a subsurface dip data model 712.

In a non-limiting example, receiving the dipmeter logging data 708 may include receiving the data from an input device, retrieving the data from a computer-readable medium, or a combination thereof. The image processing module 704 receives the dipmeter logging data 708 from a computer-readable medium of one or more logging tools (e.g., a dipmeter tool), a computer-readable medium storing data remotely to the present system, or the like, for example. In a non-limiting example, the image processing module 704 receives different sets of the dipmeter logging data 708 at different times and stores the different sets to a computer-readable medium of the system 700 (not explicitly shown). In response to receiving a request to identify dip data, the image processing module 704 may then retrieve the dipmeter logging data 708 from the computer-readable medium for processing. In a non-limiting example, the processing may include the image processing module 704 aggregating the dipmeter logging data 708.

In a non-limiting example, the image processing module 704 generates one or more image arrays using the dipmeter logging data 708. The image processing module 704 generates the one or more image arrays using the techniques described with respect to FIG. 1, for example. The image processing module 704 smooths the one or more image arrays. The image processing module 704 smooths the one or more image arrays using the techniques described with respect to FIG. 1, for example. The image processing module 704 converts the one or more image arrays into the one or more photo images 710. The image processing module 704 converts the one or more image arrays into the one or more photo images 710 using the techniques described with respect to FIG. 1, for example. The image processing module 704 decomposes the one or more photo images 710 to one or more color components of a color matrix. The color matrix may include a red component, a green component, a blue component, and a grayscale component, for example. The image processing module 704 decomposes the one or more photo images 710 to one or more color components of a color matrix using the techniques described with respect to FIG. 1, for example. The image processing module 704 generates one or more borehole image logs using a first color component of the color matrix. The first color component is a grayscale component, for example. The image processing module 704 generates one or more borehole image logs using the first color component of the color matrix using the techniques described with respect to FIG. 1, for example.

The image processing module 704 transforms the decomposition of the first color component of the color matrix to one or more unoriented borehole image logs, in a non-limiting example. The image processing module 704 transforms the decomposition of the first color component of the color matrix to one or more unoriented borehole image logs using the techniques described with respect to FIG. 1, for example. The image processing module 704 orients the one or more unoriented borehole image logs using one or more of a borehole azimuth and deviation, a pad azimuth, or a borehole caliper. The image processing module 704 orients the one or more unoriented borehole image logs using one or more of a borehole azimuth and deviation, a pad azimuth, or a borehole caliper using the techniques described with respect to FIG. 1, for example. In a non-limiting example, the image processing module 704 determines the borehole azimuth and deviation using the dipmeter logging data, determines the pad azimuth using the dipmeter logging data, and determines the borehole caliper using the dipmeter logging data.

In a non-limiting example, the dip data module 706 generates a first dip data using the dipmeter logging data 708. The dip data module 706 generates the first dip data using the techniques described with respect to FIG. 1, for example. The dip data module 706 generates a corrected dip data based on the first dip data and the one or more oriented borehole image logs. The dip data module 706 generates the corrected dip data using the techniques described with respect to FIG. 1, for example.

The output of the system 700 may include displaying one or more plots, graphs, or images that enable visualization of the subsurface formation (e.g., the output 200, the output 300, the output 400, the output 500, the output 600). The output can then be rendered on a display device (e.g., a display device as described with respect to FIG. 8), and thus enable a user (e.g., a technician) to visualize one or more results of the system 700. For example, the image processing module 704 causes a display device to display at least one of the one or more image arrays, the one or more photo images 710, the one or more unoriented borehole image logs, or the one or more oriented borehole image logs. In another example, the dip data module 706 causes the display device to display at least one of the first dip data or the corrected dip data as the subsurface dip data model 712. In some examples, the output can be stored in a computer-readable medium (e.g., a computer-readable medium as described with respect to FIG. 8). The computer-readable medium may be a computer-readable medium of the cloud, which enables remote access, for example.

The methods (e.g., the method 100) and systems (e.g., the system 700) described herein may be used to identifying structural and sedimentary features in subsurface formations, and more particularly, to identify dip data in subsurface formations. Identification of the dip data improves modeling of fluid flow patterns in reservoirs.

In view of the foregoing structural and functional description, those skilled in the art will appreciate that portions of the embodiments described herein may be implemented as a method, data processing system, or computer program product (e.g., computer application). Accordingly, these portions of the present disclosure may take the form of an entirely hardware embodiment, an entirely software embodiment, or an embodiment combining software and hardware, such as shown and described with respect to the computer system of FIG. 8. Furthermore, portions of the embodiments herein may be a computer program product on a computer-readable medium having computer-readable program code on the medium. Any suitable non-transitory computer-readable medium may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage medium may include a semiconductor-based circuit or device or other integrated circuit (IC) (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments described herein have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks. These computer-executable instructions may also be stored in a computer-readable medium that can direct a computer or other programmable data processing apparatus to function in a particular manner, such that the instructions stored in the computer-readable medium result in an article of manufacture including instructions which implement the function specified in the flowchart block or blocks. The computer-executable instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 8:
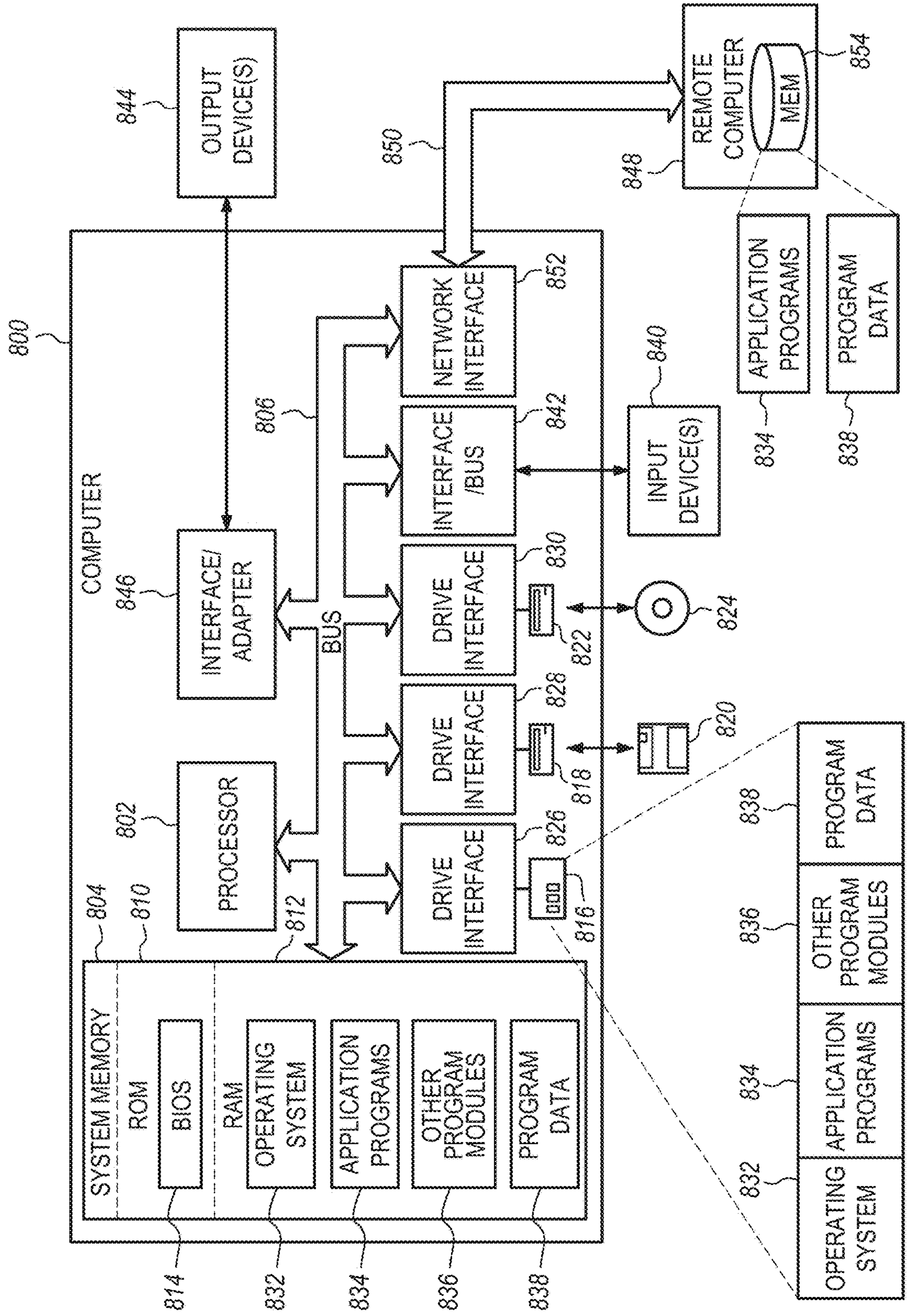
FIG. 8 is a block diagram of a computer system for converting dipmeter log curves to borehole image logs to identify dip data of a subsurface formation, in accordance with certain embodiments.

FIG. 8 is a block diagram of a computer system 800 that can be for converting dipmeter log curves to borehole image logs to identify dip data of a subsurface formation in accordance with certain embodiments described. The computer system 800 may be the computer system used to implement at least part of the method 100 of FIG. 1, for example. The computer system 800 may be used to implement, at least in part, the system 700, for example. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. Dual microprocessors and other multiprocessor architectures also can be used as processing unit 802. System bus 806 may be any of several types of bus structure including a memory bus or memory controller, a peripheral bus, and a local bus using any of a variety of bus architectures.

System memory 804 includes read only memory (ROM) 810 and random access memory (RAM) 812. A basic input/output system (BIOS) 814 or a Unified Extensible Firmware Interface (UEFI) can reside in ROM 810 containing the basic routines that help to transfer information among elements within computer system 800.

Computer system 800 can include a hard disk drive 816, magnetic disk drive 818, e.g., to read from or write to removable disk 820, and an optical disk drive 822, e.g., for reading CD-ROM disk 824 or to read from or write to other optical media. Hard disk drive 816, magnetic disk drive 818, and optical disk drive 822 are connected to system bus 806 by a hard disk drive interface 826, a magnetic disk drive interface 828, and an optical drive interface 830, respectively. The drives and associated computer-readable medium provide nonvolatile storage of data, data structures, and computer-executable instructions for computer system 800. Although the description of computer-readable medium above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 812, including operating system 832, one or more computer application programs 834, other program modules 836, and program data 838. In some examples, the computer application programs 834 can include one or more sets of computer-executable instructions associated with one or more functions and methods programmed to perform the method 100 of FIG. 1 for converting dipmeter log curves to borehole image logs to identify dip data of a subsurface formation and the program data 838 can include the output 200 of FIG. 2, the output 300 of FIG. 3 the output 400 of FIG. 4 the output 500 of FIG. 5, or the output 600 of FIG.

6. For example, the computer applications programs 834 can include the image processing module 704 of FIG. 7 or the dip data module 706 of FIG. 7, and the program data 838 can include the dipmeter logging data 708 of FIG. 7, the photo images 710 of FIG. 7, or the subsurface dip data model 712 of FIG. 7.

A user may enter commands and information into computer system 800 through one or more input devices 840, such as a pointing device (e.g., a mouse, touch screen), keyboard, microphone, joystick, game pad, scanner, and the like. The user can employ input device 840 to edit or modify the data used by the method 100 of FIG. 1, the output 200 of FIG. 2, the output 300 of FIG. 3, the output 400 of FIG. 4, the output 500 of FIG. 5, the output 600 of FIG. 6, the dipmeter logging data 708 of FIG. 7, the photo images 710 of FIG. 7, or the subsurface dip data model 712 of FIG. 7, for example. For example, the user can employ input device 840 to insert comments for different regions of the output 600 or the subsurface dip data model 712. These and other input devices 840 are often connected to processing unit 802 through a corresponding port interface 842 that is coupled to the system bus, but may be connected by other interfaces, such as a parallel port, serial port, or universal serial bus (USB). One or more output devices 844 (e.g., display, a monitor, printer, projector, or other type of displaying device) is also connected to system bus 806 via interface 846, such as a video adapter.

Computer system 800 may operate in a networked environment using logical connections to one or more remote computers, such as remote computer 848. Remote computer 848 may be a workstation, computer system, router, peer device, or other common network node, and typically includes many or all the elements described relative to computer system 800. The logical connections, schematically indicated at 850, can include a local area network (LAN) and a wide area network (WAN). When used in a LAN networking environment, computer system 800 can be connected to the local network through a network interface or adapter 852. When used in a WAN networking environment, computer system 800 can include a modem, or can be connected to a communications server on the LAN. The modem, which may be internal or external, can be connected to system bus 806 via an appropriate port interface. In a networked environment, computer application programs 834 or program data 838 depicted relative to computer system 800, or portions thereof, may be stored in a remote memory storage device 854.

Embodiments disclosed herein include:

A. A method for converting dipmeter logs to borehole image logs, the method including generating one or more image arrays using dipmeter logging data, converting the one or more image arrays into one or more photo images, decomposing the one or more photo images to one or more color components of a color matrix, and generating one or more borehole image logs using a first color component of the color matrix.

B. A non-transitory computer-readable medium storing machine-readable instructions, which, when executed by a processor, cause the processor to generate one or more image arrays using dipmeter logging data, convert the one or more image arrays into one or more photo images, decompose the one or more photo images to one or more color components of a color matrix, and generate one or more borehole image logs using a first color component of the color matrix.

C. A system including an image processing module, implemented by at least one processor, to generate one or more photo images using dipmeter logging data; and a dip data module, implemented by the at least one processor, to determine dip data using at least one of the dipmeter logging data or a borehole image log generated based on the one or more photo images.

Each of embodiments A through C may have one or more of the following additional elements in any combination: Element 1: where the one or more color components of the color matrix include a grayscale component; Element 2: smoothing the one or more image arrays; Element 3: where the one or more borehole image logs are one or more oriented borehole image logs, and transforming the decomposition of the first color component of the color matrix to one or more unoriented borehole image logs; Element 4: orienting the one or more unoriented borehole image logs using one or more of a borehole azimuth and deviation, a pad azimuth, or a borehole caliper; Element 5: determining the borehole azimuth and deviation using the dipmeter logging data, determining the pad azimuth using the dipmeter logging data, and determining the borehole caliper using the dipmeter logging data; Element 6: displaying the one or more oriented borehole image logs; Element 7: generating dip data based on the one or more oriented borehole image logs; Element 8: where the one or more image arrays are smoothed, and where the first color component is a grayscale component, and where the one or more borehole image logs are one or more oriented borehole image logs, and where the processor is operable to smooth the one or more image arrays, transform the decomposition of the grayscale component to one or more unoriented borehole image logs, and orient the one or more unoriented borehole image logs using one or more of a borehole azimuth and deviation, a pad azimuth, or a borehole caliper; Element 9: where the processor is operable to determine the borehole azimuth and deviation using the dipmeter logging data, determine the pad azimuth using the dipmeter logging data, and determine the borehole caliper using the dipmeter logging data; Element 10: where the processor is operable to generate dip data using at least one of the dipmeter logging data, and correct the dip data based on the one or more oriented borehole image logs; Element 11: where the processor is operable to cause an output device to display at least one of the one or more image arrays, the one or more photo images, the one or more unoriented borehole image logs, the one or more oriented borehole image logs, the dip data generated using the dipmeter logging data, or the corrected dip data; Element 12: where the image processing module is configured to cause the processor to generate one or more image arrays using the dipmeter logging data, convert the one or more image arrays into the one or more photo images, decompose the one or more photo images to one or more color components of a color matrix, and generate one or more borehole image logs using a first color component of the color matrix; Element 13: where the one or more color components of the color matrix include a grayscale component, and where the one or more borehole image logs are one or more oriented borehole image logs, and where the image processing module is configured to cause the processor to smooth the one or more image arrays, transform the decomposition of the first color component of the color matrix to one or more unoriented borehole image logs, and orient the one or more unoriented borehole image logs using one or more of a borehole azimuth and deviation, a pad azimuth, or a borehole caliper; Element 14: where the image processing module is configured to cause the processor to determine the borehole azimuth and deviation using the dipmeter logging data, determine the pad azimuth using the dipmeter logging data, and determine the borehole caliper using the dipmeter logging data; Element 15: where the image processing module is configured to cause the processor to cause a display device to display at least one of the one or more image arrays, the one or more photo images, the one or more unoriented borehole image logs, or the one or more oriented borehole image logs; Element 16: where the dip data module is configured to cause the processor to generate a first dip data using the dipmeter logging data, and generate a corrected dip data based on the first dip data and the one or more oriented borehole image logs; and Element 17: where the dip data module is configured to cause the processor to cause a display device to display at least one of the first dip data or the corrected dip data as a subsurface dip data model.

By way of non-limiting example, exemplary combinations applicable to A through C include: Element 1 with Element 2; Element 1 with Element 3; Element 1 with Element 4; Element 1 with Element 5; Element 1 with Element 6; Element 1 with Element 7; Element 3 with Element 4;

Element 4 with Element 5; Element 4 with Element 6; Element 4 with Element 7; Element 5 with Element 6; Element 5 with Element 7; Element 6 with Element 7; Element 8 with Element 9; Element 9 with Element 10; Element 9 with Element 11; Element 5 with Element 7; Element 6 with Element 7; Element 8 with Element 9; Element 8 with Element 10; Element 8 with Element 11; Element 9 with Element 10; Element 9 with Element 11; Element 12 with Element 13; Element 12 with Element 14; Element 12 with Element 15; Element 12 with Element 16; Element 12 with Element 17; Element 13 with Element 14; Element 13 with Element 15; Element 13 with Element 16; Element 13 with Element 17; and Element 16 with Element 17.

In a non-limiting example, an accuracy of the method 100 may be determined by reversing the method 100 using borehole images logs generated by borehole logging tools. The borehole images are images generated using logging and data-processing techniques within a borehole. The logging techniques may use one or more of electrical imaging (e.g., electrical resistivity imaging (ERI), electrical resistivity tomography (ERT)), optical imaging (e.g., computed tomography (CT) scans), acoustic imaging (e.g., ultrasonic), or other technique for capturing images within a borehole. For example, the borehole image logs may be generated using full-bore formation microimager (FMI) data. The method includes extracting four to eight logging curves and associated pad azimuth data from the borehole image log. The method also includes performing the method 100 to convert the four to eight dipmeter log curves and the pad azimuth data to a borehole image log. The method includes comparing the borehole image log converted from the four to eight dipmeter log curves to the borehole image logs generated using the FMI data.

The terminology used herein is for the purpose of describing particular embodiments only and is not intended to limit this disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting. The use of "including," "comprising," "having," "containing," "involving," and variations thereof herein, is meant to encompass items listed thereafter and equivalents thereof as well as additional items. While the disclosure has described several exemplary embodiments, it will be understood by those skilled in the art that various changes can be made, and equivalents can be substituted for elements thereof, without departing from the spirit and scope of the invention.

In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method for converting dipmeter logs to borehole image logs, the method comprising:

generating one or more two-dimensional (2D) image arrays using by transforming one dimensional (1D) plots of dipmeter logging data characterizing dipmeter log curves into a visual representation that preserves spatial relationships between measurements from arms of a dipmeter tool at corresponding depths in a borehole;

converting the one or more 2D image arrays into one or more photo images;

decomposing the one or more photo images to color components of a color matrix including a red component, a green component, a blue component, and a grayscale component, wherein decomposing the one or more photo images converts the one or more photo images into a grayscale image having a layer per color component; and generating one or more borehole image logs using a first color component of the color matrix, wherein the first color component is the grayscale component and the one or more borehole image logs correspond to the borehole traversed by the dipmeter tool.

2. The method of claim 1, further comprising smoothing the one or more 2D image arrays.

3. The method of claim 1, wherein the one or more borehole image logs are one or more oriented borehole image logs, and further comprising transforming a decomposition of the first color component of the color matrix to one or more unoriented borehole image logs.

4. The method of claim 3, further comprising orienting the one or more unoriented borehole image logs using one or more of a borehole azimuth and deviation, a pad azimuth, or a borehole caliper.

5. The method of claim 4, further comprising:

determining the borehole azimuth and deviation using the dipmeter logging data;

determining the pad azimuth using the dipmeter logging data; and determining the borehole caliper using the dipmeter logging data.

6. The method of claim 5, further comprising displaying the one or more oriented borehole image logs.

7. The method of claim 6, further comprising generating dip data based on the one or more oriented borehole image logs.

8. A non-transitory computer-readable medium storing machine-readable instructions, which, when executed by a processor, cause the processor to:

generate one or more two-dimensional (2D) image arrays by transforming one dimensional (1D) plots of dipmeter logging data characterizing dipmeter log curves into a visual representation that preserves spatial relationships between measurements from arms of a dipmeter tool at corresponding depths in a borehole;

convert the one or more 2D image arrays into one or more photo images;

decompose the one or more photo images to color components of a color matrix including a red component, a green component, a blue component, and a grayscale component, wherein decomposing the one or more photo images converts the one or more photo images into a grayscale image having a layer per color component; and generate one or more borehole image logs using a first color component of the color matrix, wherein the first color component is the grayscale component and the one or more borehole image logs correspond to the borehole traversed by the dipmeter tool.

9. The non-transitory computer-readable medium of claim 8, wherein the one or more borehole image logs are one or more oriented borehole image logs, and wherein the processor is operable to:

smooth the one or more 2D image arrays;

transform the decomposition of the grayscale component to one or more unoriented borehole image logs; and orient the one or more unoriented borehole image logs using one or more of a borehole azimuth and deviation, a pad azimuth, or a borehole caliper.

10. The non-transitory computer-readable medium of claim 9, wherein the processor is operable to:

determine the borehole azimuth and deviation using the dipmeter logging data;

determine the pad azimuth using the dipmeter logging data; and determine the borehole caliper using the dipmeter logging data.

11. The non-transitory computer-readable medium of claim 10, wherein the processor is operable to:

generate dip data using at least one of the dipmeter logging data; and correct the dip data based on the one or more oriented borehole image logs.

12. The non-transitory computer-readable medium of claim 10, wherein the processor is operable to cause an output device to display at least one of the one or more 2D image arrays, the one or more photo images, the one or more unoriented borehole image logs, the one or more oriented borehole image logs, dip data generated using the dipmeter logging data, or corrected dip data.

13. A system comprising:

an image processing module, implemented by at least one processor, configured to:

generate one or more image arrays by transforming dipmeter logging data into a visual representation that preserves spatial relationships between measurements from arms of a dipmeter tool at corresponding depths in a borehole;

convert the one or more image arrays into one or more photo images;

decompose the one or more photo images to color components of a color matrix including a red component, a green component, a blue component, and a grayscale component, wherein decomposing the one or more photo images converts the one or more photo images into a grayscale image having a layer per color component; and generate one or more borehole image logs using a first color component of the color matrix, wherein the first color component is the grayscale component and the one or more borehole image logs correspond to the borehole traversed by the dipmeter tool; and a dip data module, implemented by at the least one processor, to determine dip data using at least one of the one or more borehole image logs.

14. The system of claim 13, wherein the one or more borehole image logs are one or more oriented borehole image logs, and wherein the image processing module is configured to cause the at least one processor to:

smooth the one or more image arrays;

transform the decomposition of the first color component of the color matrix to one or more unoriented borehole image logs; and orient the one or more unoriented borehole image logs using one or more of a borehole azimuth and deviation, a pad azimuth, or a borehole caliper.

15. The system of claim 14, wherein the image processing module is configured to cause the at least one processor to:

determine the borehole azimuth and deviation using the dipmeter logging data;

determine the pad azimuth using the dipmeter logging data; and determine the borehole caliper using the dipmeter logging data.

16. The system of claim 14, wherein the image processing module is configured to cause the at least one processor to cause a display device to display at least one of the one or more image arrays, the one or more photo images, the one or more unoriented borehole image logs, or the one or more oriented borehole image logs.

17. The system of claim 14, wherein the dip data module is configured to cause the at least one processor to:

generate a first dip data using the dipmeter logging data; and generate a corrected dip data based on the first dip data and the one or more oriented borehole image logs.

18. The system of claim 17, wherein the dip data module is configured to cause the at least one processor to cause a display device to display at least one of the first dip data or the corrected dip data as a subsurface dip data model.

* * * * *